United States Patent
Yano et al.

(10) Patent No.: US 8,677,001 B2
(45) Date of Patent: Mar. 18, 2014

(54) STREAMING TRANSMISSION METHOD SYSTEM, DATA PROCESSING APPARATUS AND COMPUTER READABLE STORAGE MEDIUM FOR MAKING UNWANTED AND MALICIOUS DATA UNEXECUTABLE FROM VOICE OR ANIMATION DATA STREAMS

(75) Inventors: Ai Yano, Kawasaki (JP); Masahide Noda, Kawasaki (JP); Yasuhide Matsumoto, Kawasaki (JP); Kenichi Horio, Kawasaki (JP); Masanobu Morinaga, Kawasaki (JP); Hitoshi Yamauchi, Kawasaki (JP); Hideaki Miyazaki, Kawasaki (JP); Noriyuki Fukuyama, Kawasaki (JP)

(73) Assignee: Fujitsu Limited, Kawasaki (JP)

( * ) Notice: Subject to any disclaimer, the term of this patent is extended or adjusted under 35 U.S.C. 154(b) by 953 days.

(21) Appl. No.: 10/740,538

(22) Filed: Dec. 22, 2003

(65) Prior Publication Data

US 2004/0143674 A1    Jul. 22, 2004

(30) Foreign Application Priority Data

Jan. 20, 2003  (JP) .................................. 2003-011502

(51) Int. Cl.
*G06F 15/16*     (2006.01)

(52) U.S. Cl.
USPC .......................................................... 709/231

(58) Field of Classification Search
USPC .......................................... 709/231; 725/135
See application file for complete search history.

(56) References Cited

U.S. PATENT DOCUMENTS

| | | | | |
|---|---|---|---|---|
| 6,014,706 A * | 1/2000 | Cannon et al. | ................ | 709/231 |
| 6,023,295 A * | 2/2000 | Pau | .......................... | 375/240.04 |
| 6,407,680 B1 * | 6/2002 | Lai et al. | .......................... | 341/50 |
| 6,519,702 B1 * | 2/2003 | Williams | ......................... | 726/23 |
| 6,735,253 B1 * | 5/2004 | Chang et al. | ............. | 375/240.16 |
| 6,826,627 B2 * | 11/2004 | Sjollema et al. | .............. | 709/250 |

(Continued)

FOREIGN PATENT DOCUMENTS

| | | |
|---|---|---|
| JP | 10-23418 | 1/1998 |
| JP | 2000-222202 | 8/2000 |

(Continued)

OTHER PUBLICATIONS

Japanese Office Action for Japanese Application No. 2003-011502; mailed Jan. 24, 2006.

*Primary Examiner* — Noel Beharry
*Assistant Examiner* — Farhad Ali
(74) *Attorney, Agent, or Firm* — Staas & Halsey LLP

(57) ABSTRACT

A data processing apparatus edits an actual data portion excluding a header from data transmitted by streaming transmission from a first information processing apparatus after start of streaming transmission. The data processing apparatus transmits edited actual data portion and header to a second information processing apparatus by streaming transmission. The second information processing apparatus reproduces the voice data or the animation data transmitted by streaming transmission. The actual data portion is edited so that the voice data or the animation data to be transmitted may be reproducible in the second information processing apparatus, and so that a program may become unexecutable even if it would be transmitted to the second information processing apparatus. Even if the voice data or the animation data transmitted from the first information processing apparatus by streaming transmission would be deteriorated, an executable virus program does not transmitted to the second information processing apparatus, thereby that makes it possible to realize the streaming transmission method which can realize simple and high security.

16 Claims, 9 Drawing Sheets

(56) References Cited

U.S. PATENT DOCUMENTS

| | | |
|---|---|---|
| 7,054,949 B2 * | 5/2006 | Jennings ................. 709/238 |
| 7,260,820 B1 * | 8/2007 | Waldspurger et al. ............. 718/1 |
| 2001/0052019 A1 * | 12/2001 | Walters et al. ................ 709/231 |
| 2002/0073238 A1 * | 6/2002 | Doron ........................... 709/246 |
| 2002/0131496 A1 * | 9/2002 | Vasudevan et al. ...... 375/240.11 |
| 2002/0164018 A1 * | 11/2002 | Wee et al. ...................... 380/37 |

FOREIGN PATENT DOCUMENTS

| | | |
|---|---|---|
| JP | 2000-278325 | 10/2000 |
| JP | 2001-67216 | 3/2001 |
| JP | 2001-111973 | 4/2001 |
| JP | 2002-118831 | 4/2002 |
| JP | 2002-373133 | 12/2002 |

* cited by examiner

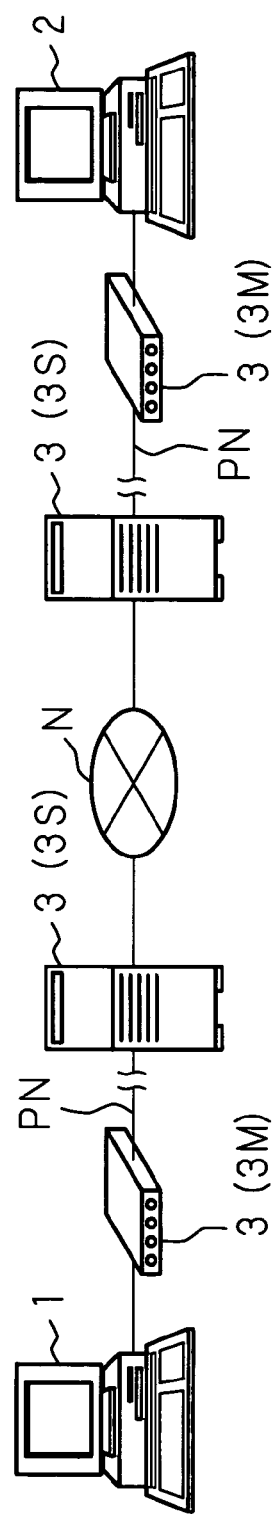
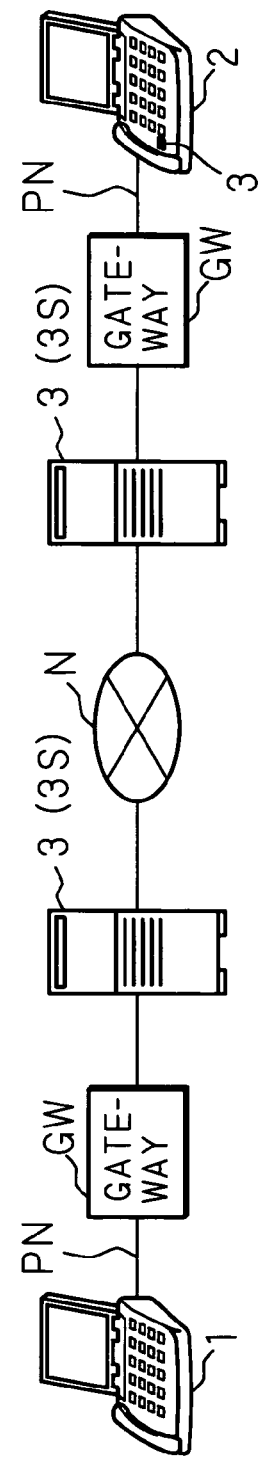

STREAMING TRANSMISSION METHOD SYSTEM, DATA PROCESSING APPARATUS AND COMPUTER READABLE STORAGE MEDIUM FOR MAKING UNWANTED AND MALICIOUS DATA UNEXECUTABLE FROM VOICE OR ANIMATION DATA STREAMS

BACKGROUND OF THE INVENTION

1. Field of the Invention

The present invention relates to a streaming transmission method, which is applied to a streaming transmission system for transmitting data by streaming transmission from one information processing apparatus to other information processing apparatuses connected to the one information processing apparatus through communication network; a streaming transmission system; a data processing apparatus, and a computer program product for operating a general computer system as the data processing apparatus of the present invention.

2. Description of Related Art

In recent years, in a Website, in order to effectively transmit information, a technique for transmitting voice data or animation data by streaming transmission (distribution) is employed. In streaming transmission, since the voice data, animation data or the like to be transmitted from a Web server is reproduced by being sequentially read from a memory of a client computer for receiving data, while being stored therein, voice or a video image can be reproduced in real time, without waiting for a completion of download of all data.

In addition, a VoIP (Voice over IP) technique for transmitting the voice data or the like over the Internet, an Intranet or the like using an IP (Internet Protocol) which is a general protocol has also become widespread. In the VoIP, by dividing digital coded voice data for every definite period of time to packetize it, the voice data is then transmitted to other information processing apparatuses. Other information processing apparatuses which have received the voice data by VoIP reproduce the voice data by sequentially reading it from a memory, while storing it therein, similar to the case of the client computer described above. The voice data can be reproduced in real time between the information processing apparatuses according to such streaming transmission of the data.

Incidentally, the streaming transmission technique is disclosed, for example, in Japanese Patent Application Laid-Open No. 2002-118831 (JP-A, 2002-118831).

However, when the client computer receives the voice data or the animation data by streaming transmission from the Web server, there is a fear that a computer virus program may be simultaneously transmitted in conjunction with the animation data or the like by streaming transmission from a malicious Web server.

When a user receives the data transmitted by streaming transmission, there is no other way but to browse the Websites to judge whether such risk would be included therein or not through intuition, even if the malicious cracker would make the computer virus program mix into the streaming data, it is difficult to ascertain that in advance.

When talking to a third person over the phone using the VoIP, there also exists a fear that the third person may transmit the computer virus program as the streaming data in addition to the voice data. Conventionally, in order to secure security, after making a user enter a user ID and a pass word for authentication prior to a call start, streaming transmission is made to start. However, once the transmission and reception of the streaming data have been started, even if the malicious speaker would transmit the computer virus program instead of the voice data, it is impossible to protect the security from such an illegal act by means of the authentication described above. In the future, it is clear that such harmful effect would become more remarkable as the data transmission from the Web server according to the streaming and the demand of the telephone according to the VoIP increase.

BRIEF SUMMARY OF THE INVENTION

The present invention has been made in view of such situations, the object thereof is to provide a streaming transmission method, a streaming transmission system, a data processing apparatus for realizing the simple and high security, and a computer program product for operating a genera computer system as the data processing apparatus of the present invention, wherein the data processing apparatus is provided between a first information processing apparatus and a second information processing apparatus, and after start of streaming transmission, by adding edits to an actual data portion to be transmitted for enabling to reproduce voice data and animation data and for making a computer virus program unexecutable in the second information processing apparatus, even if the voice data or the animation data to be transmitted would be slightly deteriorated, the computer virus program itself is not transmitted into the second information processing apparatus.

A first aspect of the streaming transmission method according to the present invention is a streaming transmission method for transmitting data by streaming transmission from a first information processing apparatus to a second information processing apparatus being connected to the first information processing apparatus through communication network and having reproducing means for reproducing the data transmitted by streaming transmission, characterized by comprising the steps of: editing an actual data portion excluding a header from the data transmitted by streaming transmission after start of streaming transmission from the first information processing apparatus, by a data processing apparatus being connected to the communication network and having operating means for processing the data transmitted by streaming transmission; transmitting the data edited by the operating means to the second information processing apparatus by streaming transmission; and reproducing the data having been transmitted by streaming transmission by the reproducing means of the second information processing apparatus.

In addition, a second aspect of the streaming transmission method according to the present invention is a streaming transmission method for transmitting data by streaming transmission from a first information processing apparatus to a second information processing apparatus being connected to the first information processing apparatus through communication network and having reproducing means for reproducing the data transmitted by streaming transmission, characterized by comprising the steps of extracting an actual data excluding a header from the data transmitted by streaming transmission after start of streaming transmission from the first information processing apparatus, by a data processing apparatus being connected to the communication network and having operating means for processing the data transmitted by streaming transmission; editing the actual data extracted by the operating means; transmitting the actual data edited by the operating means after adding the header thereto; and reproducing the data having been transmitted by streaming transmission by the reproducing means of the second information processing apparatus.

A first aspect of the streaming transmission system according to the present invention is a streaming transmission system for transmitting data by streaming transmission from a first information processing apparatus to a second information processing apparatus being connected to the first information processing apparatus through communication network and having reproducing means for reproducing the data transmitted by streaming transmission, characterized by including a data processing apparatus which is connected to the communication network and processes the data transmitted by streaming transmission, comprising: editing means for editing an actual data portion excluding a header from the data transmitted by streaming transmission after start of streaming transmission from the first information processing apparatus; and transmitting means for transmitting the data edited by the editing means to the second information processing apparatus by streaming transmission; wherein the reproducing means of the second information processing apparatus reproduces the data transmitted by the transmitting means of the data processing apparatus.

In addition, a second aspect of the streaming transmission system according to the present invention is a streaming transmission system for transmitting data by streaming transmission from a first information processing apparatus to a second information processing apparatus being connected to the first information processing apparatus through communication network and having reproducing means for reproducing the data transmitted by streaming transmission, characterized by including a data processing apparatus which is connected to the communication network and processes the data transmitted by streaming transmission, comprising: extracting means for extracting actual data excluding a header from the data transmitted by streaming transmission after start of streaming transmission from the first information processing apparatus; editing means for editing the actual data extracted by the extracting means; and transmitting means for transmitting the actual data edited by the editing means after adding the header to the second information processing apparatus by streaming transmission; wherein the reproducing means of the second information processing apparatus reproduces the data transmitted by the transmitting means of the data processing apparatus.

Furthermore, the streaming transmission system according to the present invention is characterized in that, in the first aspect described above, the reproducing means of the second information processing apparatus reproduces voice data or animation data to be transmitted by streaming transmission, and the editing means of the data processing apparatus edits the actual data portion so that the voice data or the animation data to be transmitted may become reproducible by the reproducing means of the second information processing apparatus, and so that program data different from the voice data or the animation data to be transmitted may become unexecutable on the second information processing apparatus.

Still further, the streaming transmission system according to the present invention is characterized in that, in the first aspect described above, the editing means of the data processing apparatus irreversibly compresses the actual data portion, and the transmitting means of the data processing apparatus transmits to the second information processing apparatus the actual data portion edited by the editing means together with the header in which a format of an executed compression process is described.

Still further, the streaming transmission system according to the present invention is characterized in that, in the first aspect described above, the editing means of the data processing apparatus deletes a part of the actual data portion.

Still further, the streaming transmission system according to the present invention is characterized in that, in the first aspect described above, the editing means of the data processing apparatus processes the actual data portion with use of adjustment data for adjusting voice quality of the voice data to be reproduced or image quality of the animation data to be reproduced.

Still further, the streaming transmission system according to the present invention is characterized in that, in the first aspect described above, the editing means of the data processing apparatus adds additional data including voice data or animation data to the actual data portion.

Furthermore, the streaming transmission system according to the present invention is characterized in that, in the second aspect described above, the reproducing means of the second information processing apparatus reproduces voice data or animation data to be transmitted by streaming transmission, and the editing means of the data processing apparatus edits the actual data so that the voice data or the animation data to be transmitted may become reproducible by the reproducing means of the second information processing apparatus, and so that program data different from the voice data or the animation data to be transmitted may become unexecutable on the second information processing apparatus.

Still further, the streaming transmission system according to the present invention is characterized in that, in the second aspect described above, the editing means of the data processing apparatus irreversibly compresses the actual data extracted by the extracting means, and the transmitting means of the data processing apparatus transmits to the second information processing apparatus the irreversibly compressed actual data after adding the header, in which a format of an executed compression process is described.

Still further, the streaming transmission system according to the present invention is characterized in that, in the second aspect described above, the editing means of the data processing apparatus deletes a part of the actual data extracted by the extracting means.

Still further, the streaming transmission system according to the present invention is characterized in that, in the second aspect described above, the editing means of the data processing apparatus processes the actual data extracted by the extracting means by means of adjustment data for adjusting voice quality of the voice data to be reproduced or image quality of the animation data to be reproduced.

Still further, the streaming transmission system according to the present invention is characterized in that, in the second aspect described above, the editing means of the data processing apparatus adds additional data including voice data or animation data to the actual data extracted by the extracting means.

A first aspect of the data processing apparatus according to the present invention is a data processing apparatus which processes data including voice data or animation data transmitted by streaming transmission, characterized by comprising: editing means for editing an actual data portion excluding a header from the data transmitted by streaming transmission after start of streaming transmission; and transmitting means for transmitting the data edited by the editing means to an information processing apparatus by streaming transmission; wherein the editing means edits the actual data portion so that the voice data or the animation data to be transmitted by the transmitting means may become reproducible by the information processing apparatus, and so that program data different from the voice data or the animation data to be transmitted by the transmitting means may become unexecutable by the information processing apparatus.

In addition, a second aspect of the data processing apparatus according to the present invention is a data processing apparatus which processes data including voice data or animation data transmitted by streaming transmission, characterized by comprising: extracting means for extracting an actual data excluding a header from the data transmitted by streaming transmission after start of streaming transmission; editing means for editing the actual data extracted by the extracting means; and transmitting means for transmitting to the information processing apparatus the actual data edited by the editing means after adding the header; wherein the editing means edits the actual data so that the voice data or the animation data to be transmitted by the transmitting means may become reproducible by the information processing apparatus, and so that program data different from the voice data or the animation data to be transmitted by the transmitting means may become unexecutable by the information processing apparatus.

A first aspect of the computer program product according to the present invention is a computer program product comprising a computer usable storage medium having a computer readable program code embodied therein for processing data including voice data or animation data transmitted by streaming transmission in order to reproduce the voice data or the image data by an information processing apparatus, the computer readable program code characterized by comprising: causing a computer to edit an actual data portion excluding a header from the data transmitted by streaming transmission so that the voice data or the animation data may become reproducible by the information processing apparatus, and so that program data different from the voice data or the animation data may become unexecutable by the information processing apparatus; and causing a computer to transmit the edited data to the information processing apparatuses by streaming transmission.

In addition, the first aspect of the computer program product according to the present invention is a computer program product comprising a computer usable storage medium having a computer readable program code embodied therein for processing data including voice data or animation data transmitted by streaming transmission in order to reproduce the voice data or the image data by an information processing apparatus, the computer readable program code characterized by comprising: causing a computer to extract actual data excluding a header from the data transmitted by streaming transmission; causing a computer to edit extracted actual data so that the voice data or the animation data may become reproducible by the information processing apparatus, and so that program data different from the voice data or the animation data may become unexecutable by the information processing apparatus; and causing a computer to transmit to the information processing apparatus the edited actual data after adding the header.

In the first aspect of the present invention, the first information processing apparatus and the second information processing apparatus are connected so that the data processing apparatus may be provided between them. After start of streaming transmission, the data processing apparatus edits an actual data portion excluding a header from data transmitted by streaming transmission from the first information processing apparatus. The data processing apparatus transmits an edited actual data portion and header as streaming data to the second information processing apparatus. The second information processing apparatus reproduces the voice data or the animation data to be transmitted by streaming transmission.

The data processing apparatus edits the actual data portion so that the voice data or the animation data to be transmitted may be reproducible in the second information processing apparatus, and so that even if program data different from the voice data or the animation data to be transmitted would be transmitted to the second information processing apparatus, it may become unexecutable. For example, the data processing apparatus executes a compression process (irreversible compression), which may slightly deteriorate voice quality or image quality compared to that before compression when compressed voice data or compressed animation data is expanded, with respect to the actual data portion. By this compression process, since codes of the computer virus program are treated, the computer virus program becomes unexecutable in the second information processing apparatus.

The data processing by the data processing apparatus, specifically, the edit, other than described above, such as, for example, a process for deleting a part of the actual data portion, a process of the actual data portion using adjustment data for adjusting the voice quality of the voice data or the image quality of the animation data, which is reproduced in the second information processing apparatus, a process for adding additional data including voice data or animation data prepared beforehand to the actual data portion or the like is effective. Thus, since the computer virus program can be surely treated without giving so serious problem for the reproduction of the voice data and the animation data in the second information processing apparatus, thereby that makes it possible to realize the streaming transmission system with simple and high security.

In the second aspect of the present invention, the first information processing apparatus and the second information processing apparatus are connected so that the data processing apparatus may be provided between them. After start of streaming transmission, the data processing apparatus extracts the actual data excluding the header from the data transmitted by streaming transmission from the first information processing apparatus to edit this extracted actual data. The data processing apparatus adds the header, which has been previously removed, to the edited actual data to transmit it to the second information processing apparatus as the streaming data. The second information processing apparatus reproduces the voice data or the animation data to be transmitted by streaming transmission.

The data processing apparatus edits the actual data so that the voice data or the animation data to be transmitted may be reproducible in the second information processing apparatus, and so that even if the program data different from the voice data or the animation data to be transmitted would be transmitted to the second information processing apparatus, it may become unexecutable. For example, the data processing apparatus executes a compression process (irreversible compression) which may slightly deteriorate the voice quality or the image quality compared to that before compression when compressed voice data or the animation data is expanded, with respect to the actual data. By this compression process, since codes of the computer virus program are treated, the computer virus program becomes unexecutable in the second information processing apparatus.

The data processing by the data processing apparatus, specifically, the edit, other than described above, such as, for example, a process for deleting a part of the actual data, a process of the actual data using adjustment data for adjusting the voice quality of the voice data or the image quality of the animation data, which is reproduced in the second information processing apparatus, a process for adding additional data including voice data or animation data prepared beforehand to the actual data or the like, is effective. Thus, since the computer virus program can be surely treated without giving so serious problem for the reproduction of the voice data and the animation data in the second information processing apparatus, thereby that makes it possible to realize the streaming transmission system with simple and high security.

The above and further objects and features of the invention will more fully be apparent from the following detailed description with accompanying drawings.

BRIEF DESCRIPTION OF THE SEVERAL VIEWS OF THE DRAWINGS

FIG. 8A and FIG. 8B are schematic block diagrams showing a general outline of Embodiment 2 of a streaming transmission system according to the present invention.

DETAILED DESCRIPTION OF THE PREFERRED EMBODIMENTS

The present invention is explained in full detail based on drawings showing preferred Embodiments hereinafter.

Embodiment 1

Figure 1:
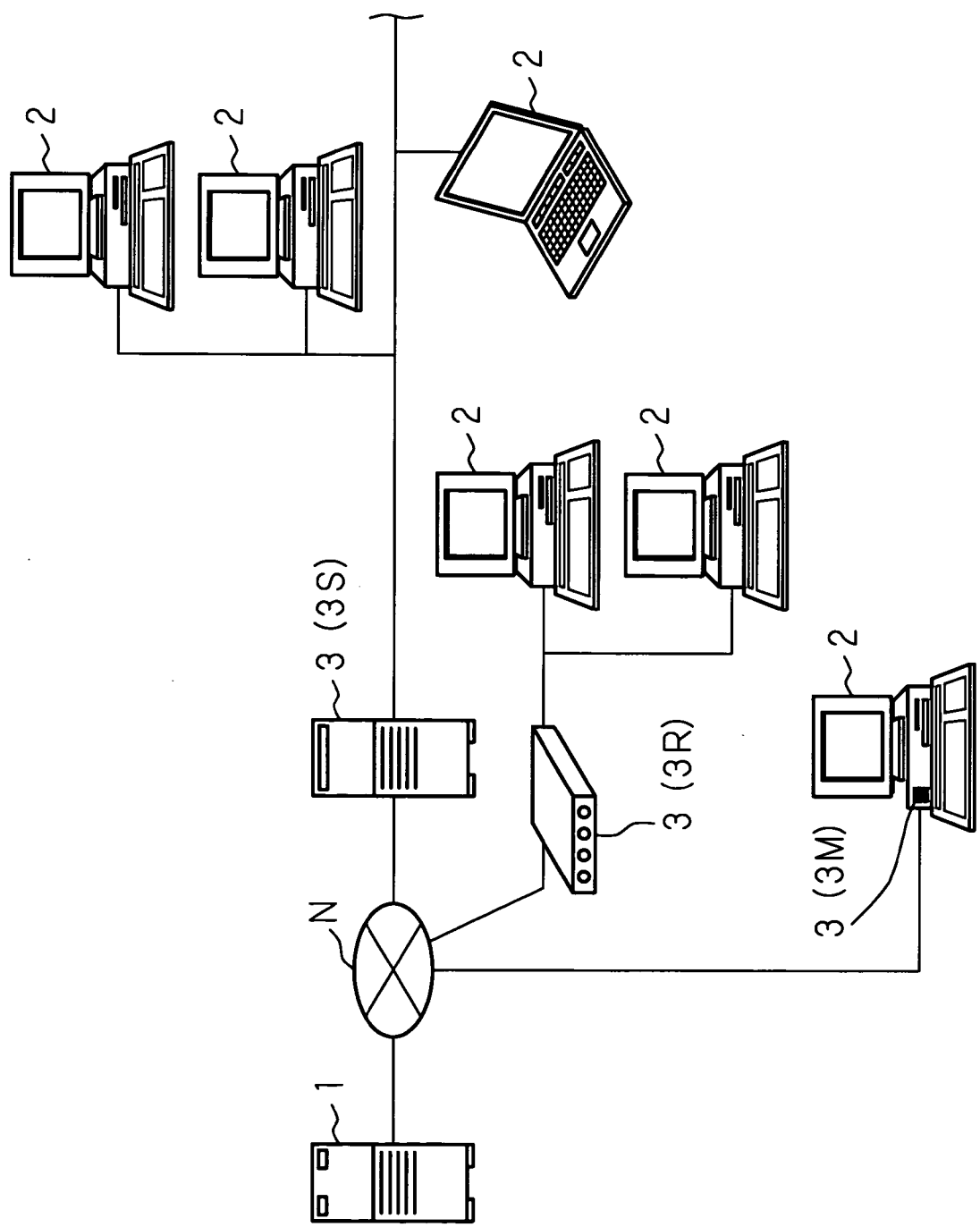
FIG. 1 is a schematic block diagram showing a general outline of Embodiment 1 of a streaming transmission system according to the present invention.

FIG. 1 is a schematic block diagram showing a general outline of Embodiment 1 of a streaming transmission system according to the present invention. In the figure, reference numeral 1 denotes a streaming server as a first information processing apparatus, which transmits animation data, voice data or the like by streaming transmission. The streaming server 1 transmits streaming data according to RTP (Real Time Transfer Protocol) through communication network N such as the Internet or the like, to computers 2, 2, and 2 . . . , which are second information processing apparatuses. A data processing apparatus 3 according to the present invention is connected to the communication network N between the streaming server 1 and the computers 2. The data processing apparatus 3 may be implemented in a router 3R, which transmits data to the computers 2, or may be implemented in a modem 3M built in the computer 2. Further, it may have a configuration where a chip, which realizes functions of the data processing apparatus 3 according to the present invention, is implemented in a server (firewall server) 3S, or a computer program product is installed thereon. Hereinafter a case where the data processing apparatus 3 is implemented inside the server 3S as a chip to be applied thereto is described.

When the data transmission according to the streaming is started by the RTP, the data processing apparatus 3 performs an edit process set forth below with respect to an actual data portion except a header portion from packet data, which is transmitted from the streaming server 1 to the computer 2. Subsequently, the edited actual data portion and the header are transmitted by streaming transmission to the computer 2 as the packet data of the streaming transmission data. The computer 2 reproduces the data which is transmitted by streaming transmission by means of plug-in software or the like of a browser. Incidentally, as needed, the header portion is removed from the packet data to extract the actual data portion, the edit process is performed with respect to the extracted actual data portion, and the edited actual data, to which the header has been added again, may be transmitted.

Figure 2:
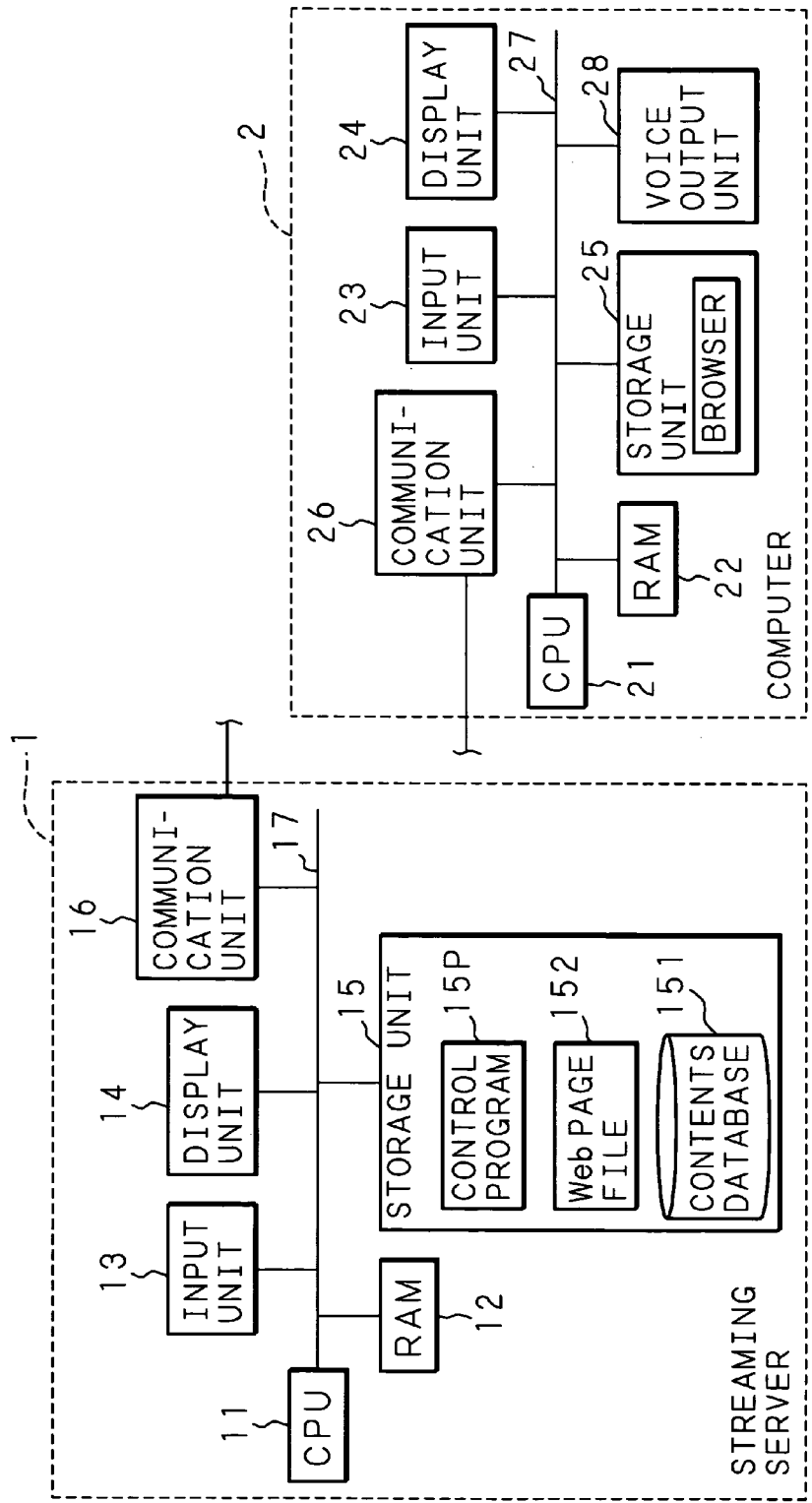
FIG. 2 is a block diagram showing a hardware configuration of a streaming server and a computer according to the Embodiment 1.

FIG. 2 is a block diagram showing a hardware configuration of the streaming server 1 and the computer 2 according to the Embodiment 1. As shown in FIG. 2, connected to a CPU (Central Processing Unit) 11 as operating means of the streaming server 1 via a bus 17 are a RAM 12, a storage unit 15, such as a hard disk, a communication unit 16, such as a gate way for transmitting and receiving information to or from the computer 2 and the data processing apparatus 3, a display unit 14, such as a liquid crystal display, and an input unit 13, such as a keyboard and a mouse. The CPU 11 is connected to each unit of the hardware of the streaming server 1 described above, via the bus 17, and not only controls them, but also executes various software-based functions according to a control program 15P, such as a CGI (Common Gateway Interface) program stored in the storage unit 15.

Further, in the storage unit 15, a Web page file 152 for storing HTML (Hyper Text Markup Language) files which are transmitted according to an acquisition request of a Web page from the computer 2, and a contents database 151 for storing the animation data which is distributed to the computer 2 are stored.

A hardware configuration of the computer 2 is then described. The configuration of the computer 2 is similar to that of a well-known personal computer (PC). As shown in FIG. 2, connected to a CPU (Central Processing Unit) 21 as operating means via a bus 27 are a RAM 22, a storage unit 25, such as a hard disk, a communication unit 26, such as a LAN card for transmitting and receiving information from or to the streaming server 1 and the data processing apparatus 3, a display unit 24, such as a liquid crystal display, a voice output unit 28, such as a loudspeaker, and an input units 23, such as a keyboard and a mouse. The CPU 21 is connected to each unit of the hardware described above of the computer 2 via the bus 27, and not only controls them, but also executes various software-based functions. Incidentally, in the storage unit 25, a browser for expanding the HTML files which are downloaded from the streaming server 1 is stored. A player for reproducing the animation data or the like, which is transmitted by streaming transmission, is also prepared as plug-in software of the browser.

Figure 3:
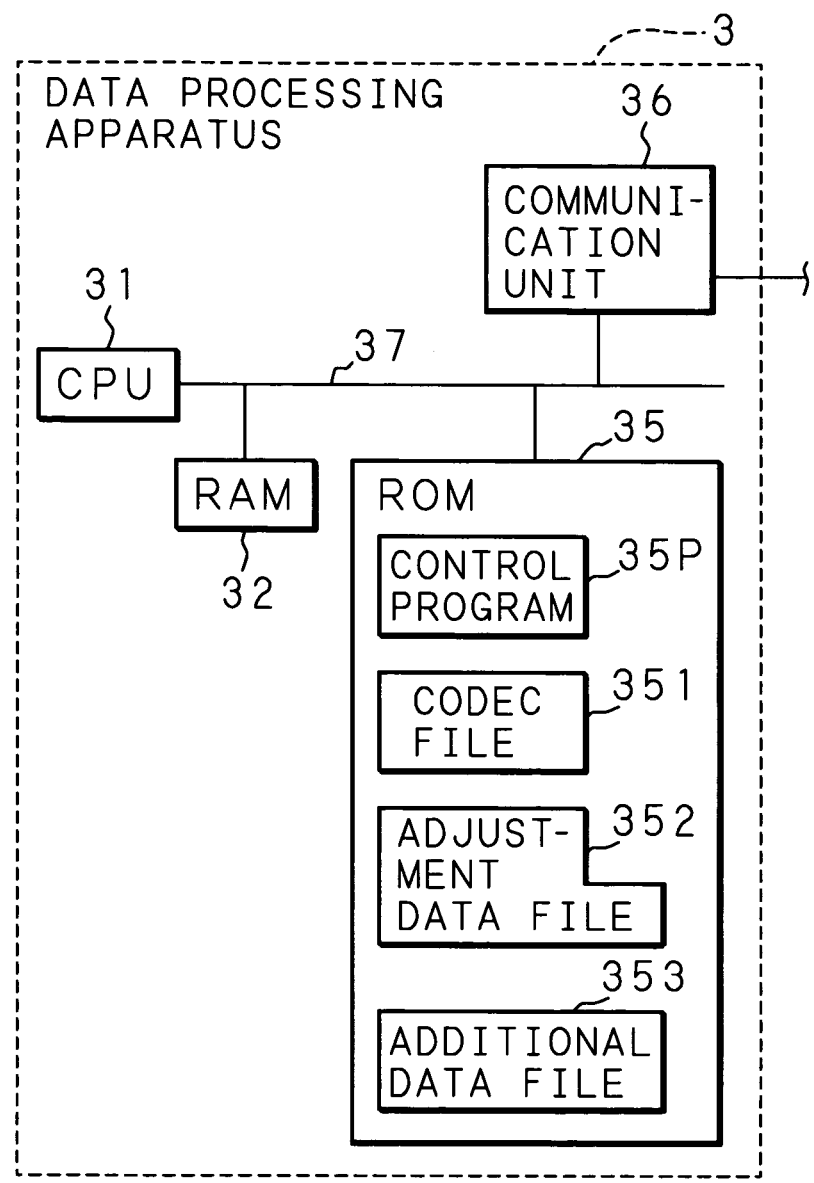
FIG. 3 is a block diagram showing a hardware configuration of a data processing apparatus of the Embodiment 1.

FIG. 3 is a block diagram showing a hardware configuration of the data processing apparatus 3 of the Embodiment 1. As shown in FIG. 3, connected to a CPU (Central Processing Unit) 31 as operating means via a bus 37 are a RAM 32, a ROM 35, a communication unit 36 for transmitting and receiving information to or from the streaming server 1 and the computer 2. The CPU 31 is connected to each unit of the hardware described above of the data processing apparatus 3 via the bus 37, and not only controls them, but also executes various software-based functions according to a control program 35P stored in the ROM 35.

In addition, in the ROM 35, a CODEC file 351, an adjustment data file 352, and an additional data file 353 each for editing data transmitted by streaming transmission are stored. In the CODEC file 351, various drivers for compressing or expanding the voice data and the animation data are stored. Various drivers are prepared therein, and G.711, G.722, G.723.1, G.728, G.729 and the like are prepared for the voice data. In addition, H.261, H.263 and the like are prepared for the animation data.

Figure 4:
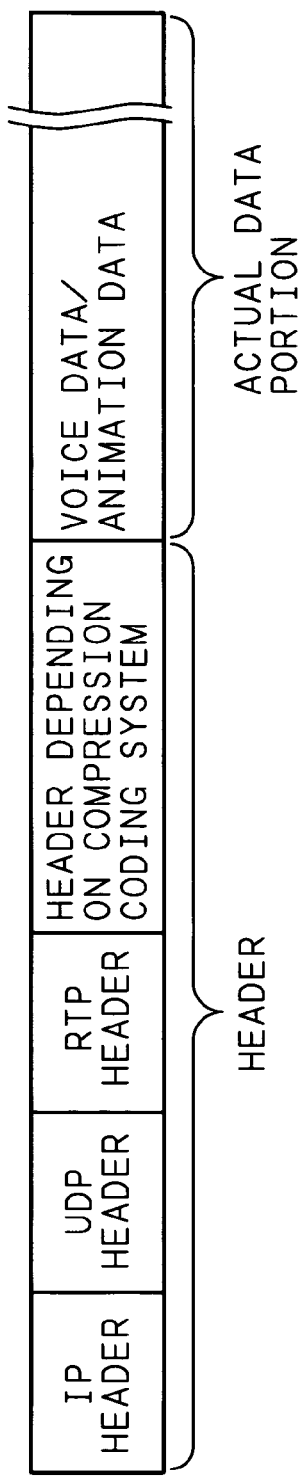
FIG. 4 is an explanatory diagram showing a data structure of packet data.

FIG. 4 is an explanatory diagram showing a data structure of the packet data. As shown in the FIG. 4, the packet data consists of a header and an actual data portion. The header consists of an IP header, a UDP (User Datagram Protocol) header, an RTP header, a header depending on a compression coding system and the like. The actual data portion consists of the voice data, the animation data and the like, and is compressed according to a compression format described in the header portion depending on the compression coding system. The computer virus program may be mixed in this actual data portion. Referring to the compression format described in the header portion depending on the compression coding system, the CPU 31 of the data processing apparatus 3 performs the expanding process to the actual data portion with respect to the actual data portion excluding the header portion in the data to be transmitted as one of the editing means, and expands the expanded data to the RAM 32. Thereby the voice data, the animation data, and also the computer virus program are expanded.

The CPU 31 compresses the actual data portion again according to a irreversible compression format. Although the quality of the voice data or the animation data is slightly deteriorated by this irreversible compression process, the codes of the computer virus program are treated by the irreversible compression process so as to become unexecutable on the computer 2. The CPU 31 transmits the actual data portion and the header, in which the compression format after the compression process is described as the data transmitted by streaming transmission, to the computer 2.

For other editing means, the actual data portion is processed using the adjustment data for adjusting the voice quality or the image quality. The adjustment data file 352 which stores various adjustment data is stored in the ROM 35. The adjustment data corresponds to, for example, data for compensating (compensation from the lightness 128 of the original image to the lightness 150, compensation for reducing the lightness of the entire original image, or the like) a tone curve of the image, data for compensation (compensation for eliminating the data which is equal to or less than a fixed level) to remove the noise in the voice data, data for compensation to emphasize the low voice portion in the voice data, and the like. The CPU 31 reads the adjustment data from the adjustment data file 352, and performs the digital processing such as compensation, substitutions, or the like, with respect to the actual data portion including the voice data, the animation data, and the computer virus program. Thereby the voice or the video image is reproducible on the computer 2, being slightly different from the original data. On the other hand, for the computer virus program, the code itself is digitally processed and treated, it becomes unexecutable on the computer 2.

In addition, for the other editing means, an additional data including the voice data or image data prepared beforehand is added to the actual data portion. The data to be added is stored in the additional data file 353. As the additional data, music data which may be used as BGM, or image data such as Logos or the like is effective. This adding process would not have significant effect on the reproduction of the voice and the video image. On the other hand, since the other data is added to its code itself, the computer virus program becomes unexecutable on the computer 2. Further, as other editing means, the CPU 31 deletes a part of the actual data portion. Incidentally, a ratio to be deleted may be determined according to the strength of the security. When strengthening the security, although the voice quality and the image quality may be deteriorated to a certain degree, a process for deleting the data every several bytes is performed. On the other hand, when putting more importance on the voice quality and the image quality than the security, the data may just be deleted every several K bytes. In addition, as the editing means for the actual data portion, any one described above may be used, or some of them may be combined to execute. Moreover, in order to prevent that the algorithm of the edit process is easily analyzed by the third person, each editing means may be suitably switched for every definite period of time to edit the actual data portion.

Figure 5:
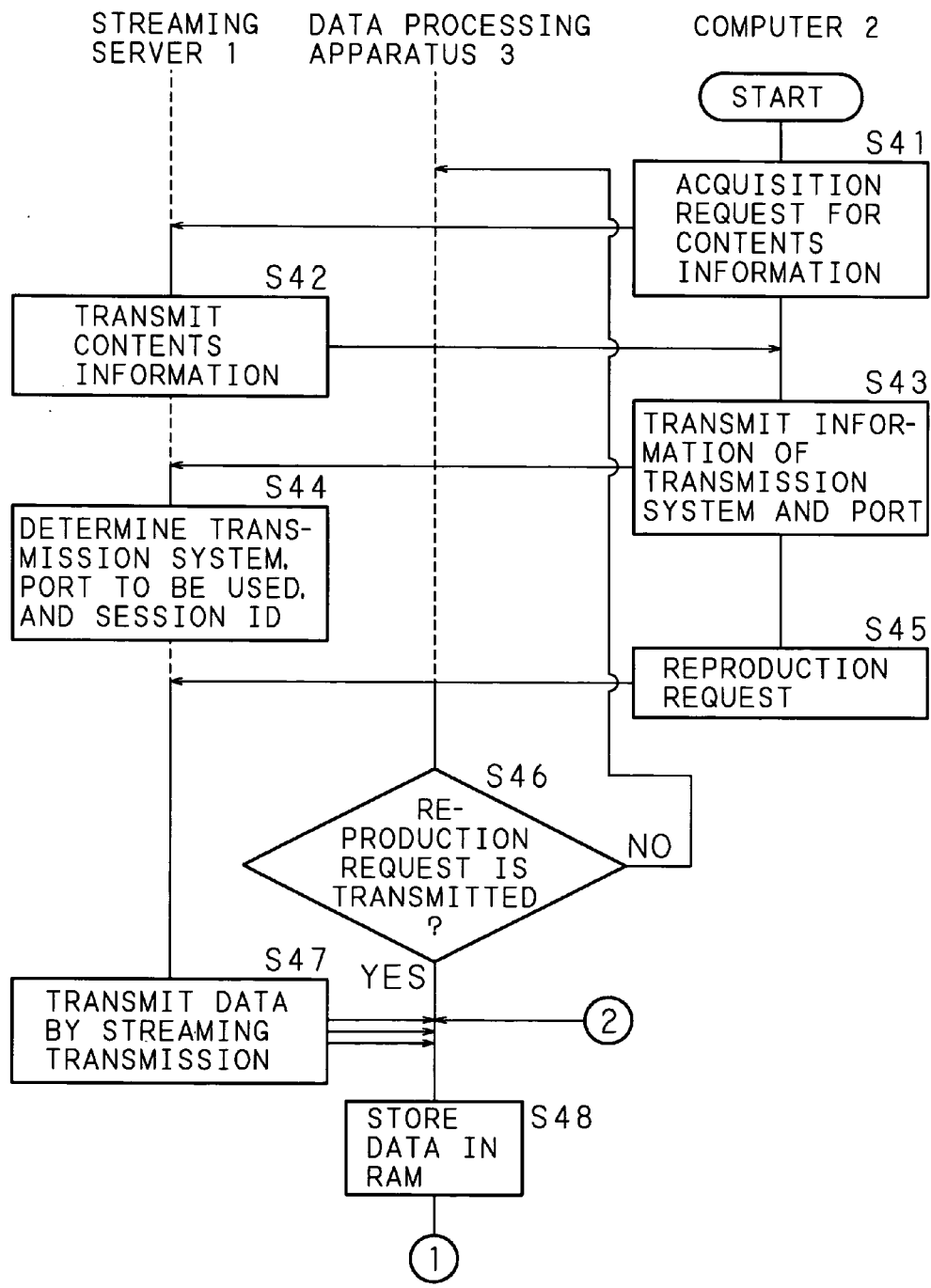
FIG. 5 is a flow chart showing a transmission procedure of streaming data according to the Embodiment 1.
Figure 6:
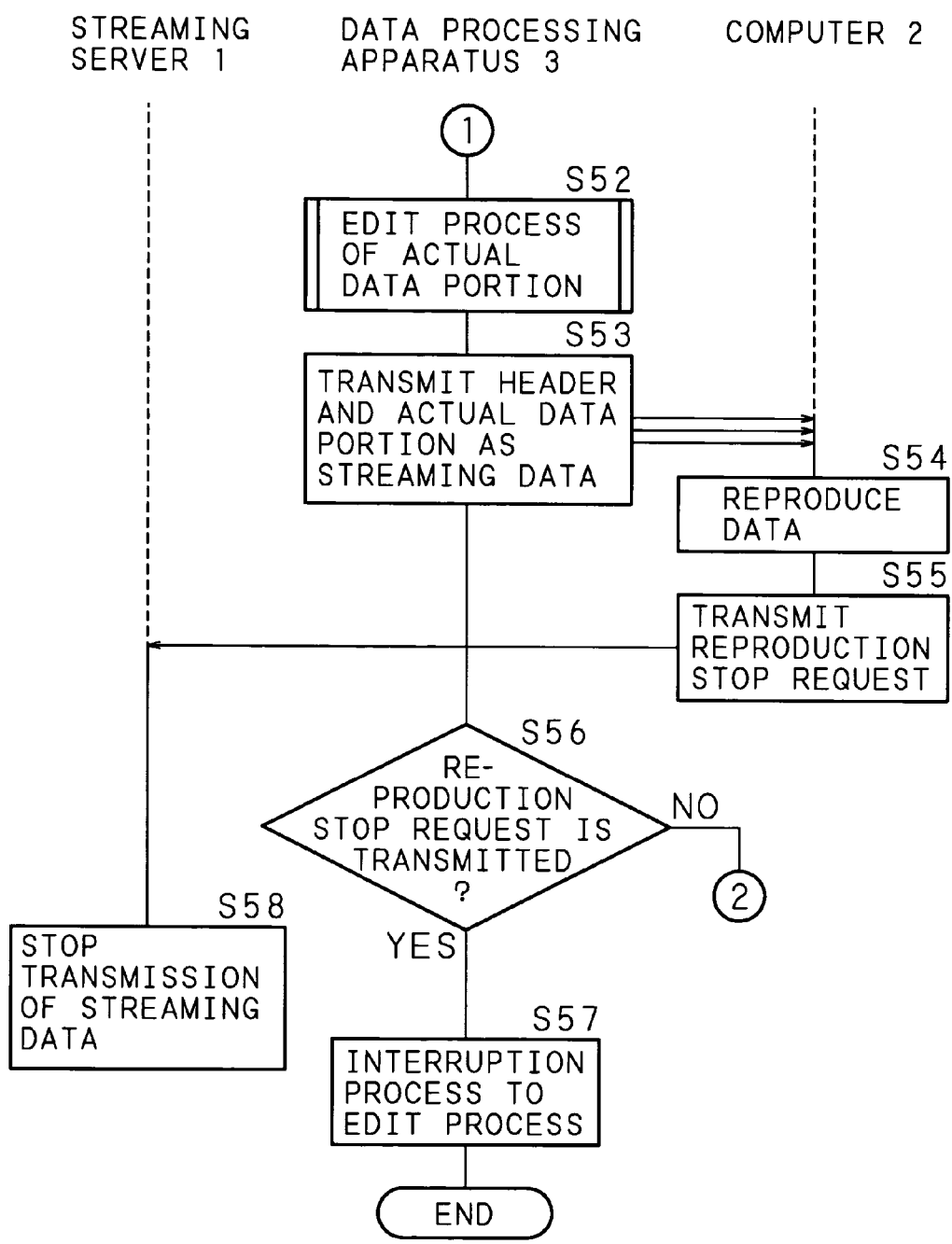
FIG. 6 is a flow chart showing a transmission procedure of streaming data according to the Embodiment 1.

Procedures such as edit processes in the above hardware configuration are described using a flow chart. FIG. 5 and FIG. 6 are flow charts showing a transmission procedure of the streaming data according to the Embodiment 1. First, a user operates the input unit 23 of the computer 2 to start the browser. The user inputs a predetermined URL (Uniform Resource Locaters) from the input unit 23, and accesses the streaming server 1. After access is established, according to RTSP (Real Time Streaming Protocol), using a DESCRIBE method of the player of the browser, the CPU 21 performs the acquisition request for the contents information to the streaming server 1 (step S41). The CPU 11 of the streaming server 1 transmits the contents information with reference to the contents database 151 (step S42). Incidentally, the information such as acquisition request for the contents information, which is transmitted and received between the streaming servers 1 and the computer 2, passes through the data processing apparatus 3. However, as described below, the edit process by the data processing apparatus 3 is not executed, unless the reproduction request from the computer 2 is received, in other words, unless the transmission of the streaming data is started. The CPU 21 of the computer 2 acquires the contents information, and stores it in the RAM 22. The CPU 21 reads the contents information stored in the RAM 22 to displays it on the browser.

The user selects contents from the input unit 23 of the computer 2. After selecting the contents, the CPU 21 transmits information regarding a transmission system, and a port, to which streaming transmission is received, to the streaming server 1 using a SETUP method (step S43). The CPU 11 of the streaming server 1 determines a transmission system, a port to be used, a session ID or the like (step S44). The user provides an instruction for a reproduction start from the input unit 23 of the computer 2. The CPU 11 which has received the instruction of the reproduction start sends the reproduction request (step S45) to the streaming server 1 using a PLAY method. Receiving a reproduction request, the CPU 11 of the streaming server 1 reads the data from the contents database 151 according to the RTP (Real Time Transfer Protocol) (UDP is also used as a lower level protocol) to transmit it to the computer 2 by streaming transmission (step S47).

The CPU 31 of the data processing apparatus 3 sequentially checks the data described above which passes through the communication unit 36, and judges whether the reproduction request has been transmitted from the computer 2 or not (step S46). When no reproduction request has been transmitted (NO at step S46), the CPU 31 waits until receiving the reproduction request. On the other hand, when the reproduction request has been transmitted (YES at step S46), it judges that the transmission of the streaming data has been started, and the CPU 31 sequentially captures the streaming data, which has been transmitted according to the RTP from the streaming server 1, from the communication unit 36, and stores them in the RAM 32 (step S48).

Figure 7:
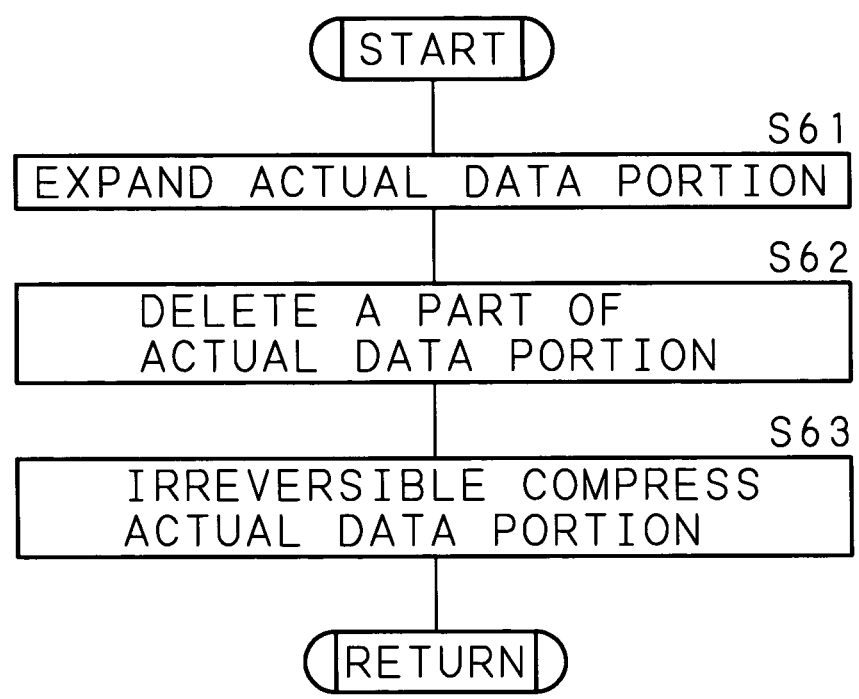
FIG. 7 is a flow chart showing a procedure of an edit process of an actual data portion according to the Embodiment 1.

The CPU 31 of the data processing apparatus 3 executes the edit process of the actual data portion excluding the header from the packet data (step S52). That is, the CPU 31 performs the edit process only for the actual data portion except the header, when the data is transmitted. FIG. 7 is a flow chart showing a procedure of the edit process of the actual data portion by the data processing apparatus 3 according to the Embodiment 1. The CPU 31 refers to the CODEC file 351, and reads the expanding driver corresponding to the compression format described in the header of the packet data. The CPU 31 executes the expanding driver that has been read, and performs the expanding process of the actual data portion (step S61). The CPU 31 performs a process for deleting a part of the actual data portion after expanding (step S62). Then, the CPU 31 reads the driver for the irreversible compression stored in the CODEC file 351, and performs the irreversible compression process of the actual data portion again after the deletion (step S63). Incidentally, although the edit process is supposed to be a combination of both the deletion of the part of the actual data portion and the irreversible compression process according to the present Embodiment, it is not limited to this.

In addition to this, when the data has not been compressed, only the deletion process of step S62 may be executed, other than adding a process for changing the actual data portion according to the adjustment data which has been read from the adjustment data file 352, the image data or the like stored in the additional data file 353 may be read for adding to the actual data portion. The CPU 31 transmits the header and the edited actual data portion by streaming transmission to the computer 2 as the streaming data (step S53).

The CPU 21 of the computer 2 sequentially expands the streaming data to be sequentially transmitted to the RAM 22 to reproduce the data (step S54). As for the data, the video image is displayed on the display unit 24 by the browser, and the voice is also reproduced in a manner where it is outputted from the voice output unit 28. In this reproduction, the voice data and the animation data are slightly deteriorated or changed by means of the irreversible compression, deletion, addition or the like rather than the original data. However, in terms of the computer virus program, since its source code or machine language is treated by the edit process, the computer virus program cannot be executed, even if it would be transmitted to the computer 2 and stored in the storage unit 25, thereby that makes it possible to keep the security. Incidentally, in the present Embodiment, although it is configured that the data processing apparatus 3 starts the edit process in response to receiving the reproduction request, on a condition that the transmission and reception of the data by the RTP has been started, the edit process may be executed as streaming transmission has been started.

When the transmission is terminated, the CPU 21 of the computer 2 transmits a reproduction stop request to the streaming server 1 (step S55) by means of a TERADOWN method according to the RTSP. The CPU 31 of the data processing apparatus 3 monitors the transmitted and received data and judges whether or not the reproduction stop request has been transmitted according to the RTSP from the computer 2 (step S56). When the reproduction stop request has not been transmitted (NO at step S56), the CPU 31 advances the process to step S48, and repeats the edit process for reproduction. On the other hand, when the reproduction stop request has been transmitted (YES at step S56), the CPU 31 applies an interruption process to the edit process or the like at step S52 to terminate the process (step S57). The CPU 11 of the streaming server 1 also terminates streaming transmission in response to the reproduction stop request from the computer 2 (step S58).

Embodiment 2

FIG. 8A and FIG. 8B are schematic block diagrams showing a general outline of Embodiment 2 of a streaming transmission system according to the present invention. The present invention is applicable also to transmission and reception of information for IP phones, IP television telephones or the like. FIG. 8A is an explanatory diagram showing a general outline of the IP phone using a personal computer. As shown in FIG. 8A, the personal computer 1 which is the first information processing apparatus and the personal computer 2 which is the second information processing apparatus are connected through the communication network N such as the Internet. Software for the IP phone, a sound card for the Internet and the like are installed on the personal computer 1 and the personal computer 2, which are connected to the server 3S of a provider through the public switched telephone network PN via the modem 3M.

The data processing apparatus 3 may be implemented within the server 3S of the provider, or may also be implemented within the modem 3M, or within the personal computer 1 and the personal computer 2. The data processing apparatus 3 edits the streaming data transmitted and received according to the algorithm described above. Incidentally, in the IP phone, both the personal computers 1 and 2 transmit the voice data by streaming transmission. In the Embodiment 1, for the sake of simplicity, although only the data editing process for either direction is described, in the present Embodiment, both personal computers 1 and 2 will transmit and receive the data transmitted by streaming transmission. In this case, the data processing apparatus 3 edits the data which is transmitted and received at both personal computers 1 and 2 by streaming transmission according to the algorithm described above.

FIG. 8B shows an example where the present invention is applied to the IP television telephone. A TV telephone 1 which is a first information processing apparatus and a TV telephone 2 which is a second information processing apparatus are connected through the communication network N such as the Internet. When the TV telephone 1 starts access to the TV telephone 2, the TV telephone 1 is connected to the server 3S of the provider through the public switched telephone network PN and gateways GW. Subsequently, after being connected to the other server 3S through the communication network N, such as the Internet or the like, again, the TV telephone 1 is connected to the TV telephone 2 through the gateways GW and the public telephone network PN. The data processing apparatus 3 may be implemented in the provider's server 3, and may also be implemented in the TV telephone 1 or 2.

Embodiment 3

Figures 9A, 9B:
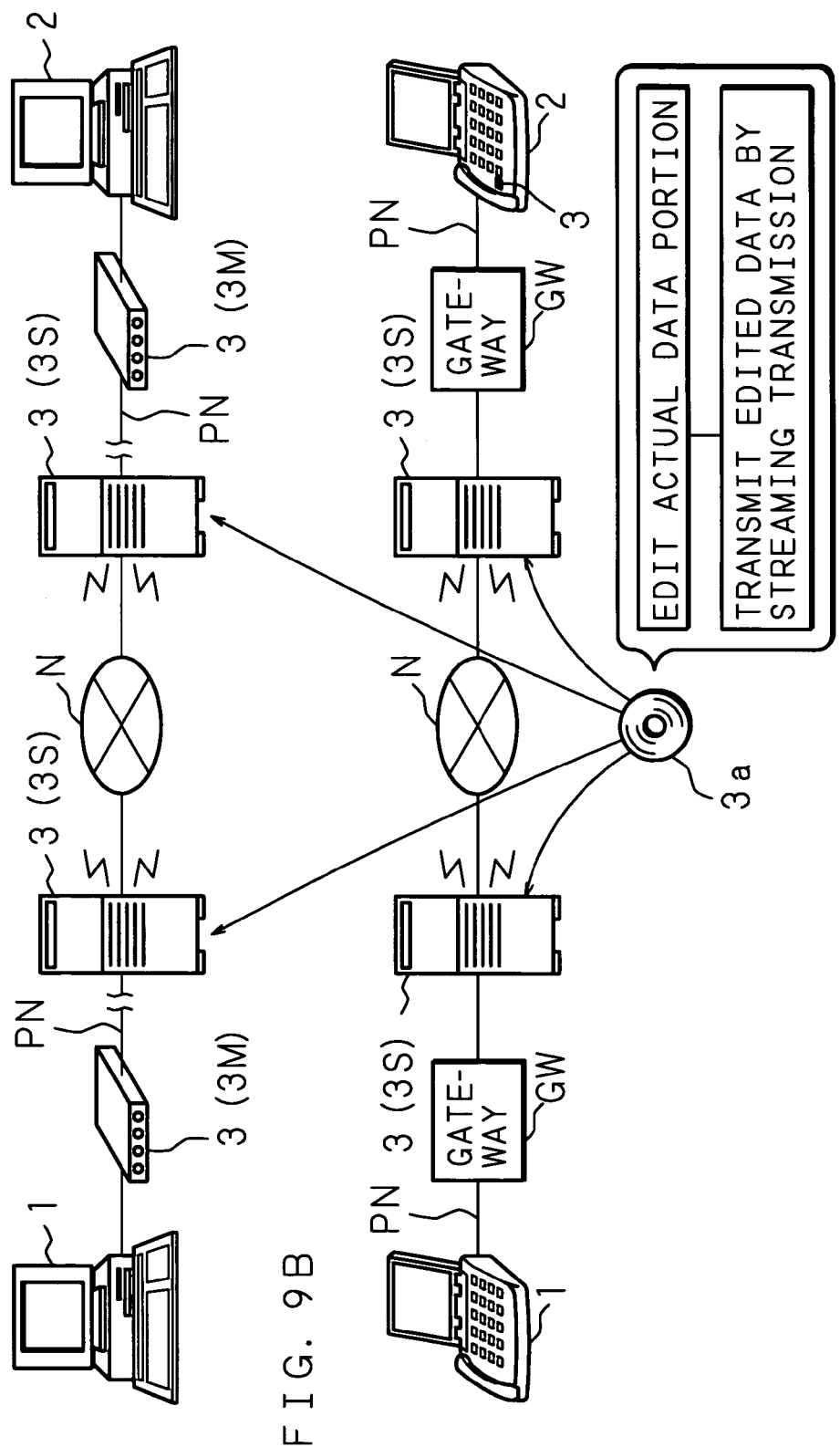
FIG. 9A and FIG. 9B are schematic block diagrams showing a general outline of Embodiment 3 of a streaming transmission system according to the present invention.

FIG. 9A and FIG. 9B are schematic block diagrams showing a general outline of Embodiment 3 of a streaming transmission system according to the present invention. A computer program product for executing functions of the data processing apparatus 3 according to the Embodiment 1 or 2 may be provided to pre-install in the server 3S, or may also be provided as a removable type recording medium, such as CD-ROMs, MOs, memory cards or the like, as the present Embodiment 3. Moreover, it may also be provided to propagate the computer program product as a carrier by way of the network. That is, instead of connecting the data processing apparatus 3 itself to the communication network between the first information processing apparatus 1 and the second information processing apparatus 2, or instead of implementing a chip for realizing functions of the data processing apparatus 3 inside the server 3S, the computer program product which has the similar function to the data processing apparatus 3 described above may be installed on the ROM of the server 3. The details thereof are described in the following.

The servers 3S shown in FIG. 9A and FIG. 9B are equipped with the recording medium 3a (CD-ROMs, MOs, memory cards, DVD-ROMs or the like), in which a program for making the actual data portion to be edited and making the edited data to be transmitted by streaming transmission is recorded. Then, the program is installed on, for example, a hard disk (not shown) of the server 3S from the recording medium 3a. Or, it may be configured so that this program is downloaded from a Web server, which is not shown here, to the hard disk of the server 3S. Such program is executed once it has been loaded to a RAM (not shown) of the server 3S from the hard disk of the same. Thereby the server 3S functions as the data processing apparatus 3 according to the present invention as described above.

Since the present Embodiment 3 is configured as described above, and other configurations and functions are similar to those of the Embodiment 1 and the Embodiment 2, the same reference numeral is given to a corresponding portion, and the detailed discussion thereof is omitted.

As described in full detail as above, in the present invention, after streaming transmission is started, the data processing apparatus edits the actual data portion excluding the header from the data transmitted by streaming transmission from the first information processing apparatus. The data processing apparatus transmits the edited actual data and the header by streaming transmission to the second information processing apparatus. The second information processing apparatus reproduces the voice data or the animation data to be transmitted by streaming transmission.

The edit of the streaming data by the data processing apparatus edits the actual data portion of the streaming data so that the voice data or animation data transmitted by streaming transmission may become reproducible in the second information processing apparatus, and so that even if a certain program data would be mixed in the voice data or the animation data transmitted by streaming transmission, it may become unexecutable in the second information processing apparatus. Thus, since the computer virus program can be treated so as to become unexecutable in the second information processing apparatus, without having a significant effect on the reproduction of the voice data and the animation data in the second information processing apparatus, thereby that makes it possible to realize the streaming transmission system with simple and high security.

As this invention may be embodied in several forms without departing from the spirit of essential characteristics thereof, the present embodiments are therefore illustrative and not restrictive, since the scope of the invention is defined by the appended claims rather than by the description preceding them, and all changes that fall within metes and bounds of the claims, or equivalence of such metes and bounds thereof are therefore intended to be embraced by the claims.

The invention claimed is:

1. A data transmission method comprising:
capturing a first data transmitted from a first information processing apparatus to a second information processing apparatus;
determining whether the first data is streaming data;
selectively editing a body data portion of the first data in accordance with a compression format represented by a header of the first data when said determining indicates that the first data is streaming data, the header being extracted from the body data portion for the editing;
irreversibly compressing the edited body data portion using an irreversible compression format to ensure that virus program data included in the body data portion is unexecutable; and
adding the header to a second data in which the irreversible compression format is described and transmitting the irreversibly compressed body data portion to the second information processing apparatus, and
wherein the selectively editing includes one of adding predetermined data to the body data portion and deleting a part of the body data portion based on a ratio determined according to a level of security, by the editing, and
the second data is adjusted by a digital processing of at least one of compensation and substitution implemented on the body data portion.

2. The streaming transmission method according to claim 1, wherein the editing of streaming data is always made upon transmission of the streaming data.

3. A data transmission method, comprising:
capturing a first data transmitted from a first information processing apparatus to a second information processing apparatus;
determining whether the first data is streaming data;
extracting a body data portion of the first data excluding a header when said determining indicates that the first data is streaming data;
selectively editing the body data portion of the first data extracted in accordance with a compression format represented by the header of the first data;
irreversibly compressing the edited body data portion using an irreversible compression format to ensure that virus program data included in the body data portion is unexecutable; and
adding the header to a second data in which the irreversible compression format described and transmitting the irreversibly compressed body portion to the second information processing apparatus, and
wherein the selectively editing includes one of adding predetermined data to the body data portion and deleting a part of the body data portion based on a ratio determined according to a level of security, by the editing, and
the second data is adjusted by a digital processing of at least one of compensation and substitution implemented on the body data portion.

4. A data transmission system, comprising:
receiving means for capturing a first data transmitted from a first information processing apparatus to a second information processing apparatus;
determining means for determining whether the first data is streaming data;
editing means for, upon determining that the first data is streaming data, selectively editing a body data portion of the first data in accordance with a compression format represented by a header, the header being extracted from the body data portion for the editing;

compressing means for irreversibly compressing the edited body data portion using an irreversible compression format to ensure that virus program data included in the body data portion is unexecutable; and transmitting means for adding the header to a second data in which the irreversible compression format described and transmitting the irreversibly compressed body data portion by said editing means to said second information processing apparatus, and wherein the selectively editing includes one of adding predetermined data to the body data portion and deleting a part of the body data portion based on a ratio determined according to a level of security, by the editing, and the second data is adjusted by a digital processing of at least one of compensation and substitution implemented on the body data portion.

5. The streaming transmission system as set forth in claim 4, wherein said editing means of said data processing apparatus irreversibly compresses the body data portion, and said transmitting means of said data processing apparatus transmits to said second information processing apparatus the body data portion edited by said editing means together with the header in which a format of an executed compression process is described.

6. The streaming transmission system as set forth in claim 4, wherein said editing means of said data processing apparatus deletes a part of the body data portion.

7. The streaming transmission system as set forth in claim 4, wherein said editing means of said data processing apparatus processes the body data portion with use of adjustment data for at least one of adjusting voice quality of voice data to be reproduced and image quality of animation data to be reproduced.

8. A data transmission system, comprising:

receiving means for capturing a first data transmitted from a first information processing apparatus to a second information processing apparatus;

determining means for determining whether the first data is streaming data;

extracting means, upon determining the first data is streaming data, for extracting a body data portion of the first data excluding a header;

editing means for selectively editing the body data portion of the first data extracted in accordance with a compression format represented by the header;

compressing means for irreversibly compressing the body data portion using an irreversible compression format to ensure that virus program data included in the body data portion is unexecutable; and transmitting means for adding the header to a second data in which the irreversible compression format described and transmitting the irreversibly compressed body data portion to said second information processing apparatus, and wherein the selectively editing includes one of adding predetermined data to the body data portion and deleting a part of the body data portion based on a ratio determined according to a level of security, by the editing, and the second data is adjusted by a digital processing of at least one of compensation and substitution implemented on the body data portion.

9. The streaming transmission system as set forth in claim 8, wherein said editing means of said data processing apparatus irreversibly compresses the body data extracted by said extracting means, and said transmitting means of said data processing apparatus transmits to said second information processing apparatus the irreversibly compressed body data after adding the header, in which a format of an executed compression process is described.

10. The streaming transmission system as set forth in claim 8, wherein said editing means of said data processing apparatus deletes a part of the body data portion extracted by said extracting means.

11. The streaming transmission system as set forth in claim 8, wherein said editing means of said data processing apparatus processes the body data portion extracted by said extracting means by at least one of adjustment data for adjusting voice quality of voice data to be reproduced and image quality of animation data to be reproduced.

12. A data processing apparatus which processes data including at least one of voice data and animation data transmitted by streaming transmission, comprising:

receiving means for capturing a first data transmitted from a first information processing apparatus to a second information processing apparatus;

determining means for determining whether the first data is streaming data;

editing means for, upon determining the first data is streaming data, selectively editing a body data portion of the first data in accordance with a compression format represented by a header to ensure virus program data, the header being extracted from the body data portion for the editing; and transmitting means for adding the header to a second data in which the compression format described and transmitting the irreversibly compressed body data portion by said editing means to an information processing apparatus; and wherein the selectively editing includes one of adding predetermined data to the body data portion and deleting a part of the body data portion based on a ratio determined according to a level of security, by the editing, and the second data is adjusted by a digital processing of at least one of compensation and substitution implemented on the body data portion.

13. A data processing apparatus which processes data including at least one of voice data and animation data transmitted by streaming transmission, comprising:

receiving means capturing a first data transmitted from a first information processing apparatus to a second information processing apparatus;

determining means for determining whether the first data is streaming data;

extracting means for, upon determining the first data is streaming data;

editing means for selectively editing the body data of the first data extracted by said in accordance with a compression format represented by the header; and transmitting means for adding the header to a second data in which an irreversibly compressed body portion compression format is described and transmitting the body data portion edited to said information processing apparatus; and wherein said editing means edits the body data of the first data excluding the header, the body data portion is irreversibly compressed using an compression format in the header selected to ensure virus program data included in the body part portion is unexecutable, and wherein the selectively editing includes one of adding predetermined data to the body data portion and deleting a part of the body data portion based on a ratio determined according to a level of security, by the editing, and the second data is adjusted by a digital processing of at least one of compensation and substitution implemented on the body data portion.

14. A non-transitory computer-readable storage medium recording computer readable program code embodied therein for processing data including at least one of voice data and animation data transmitted by streaming transmission in at least one predefined format to an information processing apparatus for reproduction thereof, the computer readable program code, when executed by a computer, causing the computer to perform a method, comprising:

capturing a first data transmitted from a first information processing apparatus to a second information processing apparatus;

determining whether the first data streaming data;

selectively editing a body data portion of the first data excluding a header, the header including a compression format, irreversibly compressing the edited body data portion using an irreversible compression format to ensure virus program data included in the body data portion is unexecutable; and adding the header to a second data in which the irreversible compression format described and transmitting the irreversibly compressed body data portion to said information processing apparatus, and wherein the selectively editing includes one of adding predetermined data to the body data portion and deleting a part of the body data portion based on a ratio determined according to a level of security, by the editing, and the second data is adjusted by a digital processing of at least one of compensation and substitution implemented on the body data portion.

15. A non-transitory computer-readable storage medium recording computer readable program code embodied therein for processing data causing a computer to perform an operation, comprising:

capturing a first data transmitted from a first information processing apparatus to a second information processing apparatus;

determining whether the first data is streaming data;

extracting body data excluding a header upon determining the data is streaming data;

selectively editing the body data in accordance with a compression format represented by the header, the header being extracted from the body data portion for the editing;

irreversibly compressing the edited body data portion using an irreversible compression format to ensure virus program data included in the body data portion is unexecutable; and adding the header to a second data in which the irreversible compression format described and the irreversibly compressed body portion to said information processing apparatus, and wherein the selectively editing includes one of adding predetermined data to the body data portion and deleting a part of the body data portion based on a ratio determined according to a level of security, by the editing, and the second data is adjusted by a digital processing of at least one of compensation and substitution implemented on the body data portion.

16. A method performed by a processor of reproducing data, comprising:

capturing a first data transmitted from a first apparatus to a second apparatus;

determining whether the first data is streaming data;

editing a body data portion of the first data in accordance with a compression format represented by a header, the header being extracted from the body data portion for the editing;

irreversibly compressing the edited body data portion using an irreversible compression format to ensure virus program data, which is in the body data portion of the first data, is unexecutable by the second apparatus, and wherein the header is added to a second data in which the irreversible compression format described and the irreversibly compressed body data portion is transmitted to the second apparatus, and wherein the selectively editing includes one of adding predetermined data to the body data portion and deleting a part of the body data portion based on a ratio determined according to a level of security, by the editing, and the second data is adjusted by a digital processing of at least one of compensation and substitution implemented on the body data portion.

* * * * *

UNITED STATES PATENT AND TRADEMARK OFFICE
CERTIFICATE OF CORRECTION

PATENT NO. : 8,677,001 B2  
APPLICATION NO. : 10/740538  
DATED : March 18, 2014  
INVENTOR(S) : Yano et al.

Page 1 of 1

It is certified that error appears in the above-identified patent and that said Letters Patent is hereby corrected as shown below:

In the Claims

Column 16, Line 53, In Claim 13, after "extracted" delete "by said".
Column 16, Lines 56-57, In Claim 13, after "body portion" delete "compression format".

Signed and Sealed this
Third Day of June, 2014

Michelle K. Lee
*Deputy Director of the United States Patent and Trademark Office*